United States Patent Office 3,145,147
Patented Aug. 18, 1964

3,145,147
FILM FORMING COMPOSITION OF COPOLYMERS OF N-VINYL-ε-CAPROLACTAM
Samuel A. Glickman, Easton, Pa., assignor to General Aniline & Film Corporation, New York, N.Y., a corporation of Delaware
No Drawing. Filed Feb. 20, 1961, Ser. No. 90,230
6 Claims. (Cl. 167—87.1)

The present invention relates to a new and improved film forming composition of copolymers of N-vinyl-ε-caprolactam.

The current and popular aerosol hair spray composition contains as the hair setting and waving medium, poly-N-vinyl pyrrolidone, more accurately, poly-N-vinyl-2-pyrrolidone, hereinafter referred to as PVP. When a PVP-alcohol solution is applied in an aerosol system to human hair under a relative humidity of less than 50%, the tendency of the resulting film to tackiness is minimal. As a result thereof, the preparation is acceptable by all consumers. However, when the relative humidity is above 50%, and particularly in humid atmospheres, films of PVP obtained by spraying from a aerosol system, pick up considerable moisture. The moisture is retained and results in a tacky film. In view of this property of moisture retention, these aerosol preparations are extremely undesirable where a dry hair condition is required as is the case with most users, especially women. The equilibrium water content of PVP depends upon the relative humidity of the atmosphere. The moisture content varies in a linear fashion with relative humidity, and the equilibrium percentage of moisture is about one-third of the relative humidity. Thus if PVP is exposed to a relative humidity of 50%, the moisture pick-up is approximately one-third of the relative humidity, and therefore the resulting film contain about 13–14% moisture. To overcome the unique hygroscopicity of PVP, it has been suggested in the cosmetic art to employ detackifying agents such as shellac, cellulose acetate-propionate, etc. The former yields films which become opaque at high humidities, and the latter yields films which are insoluble in ethyl alcohol. Carboxymethyl cellulose, cellulose acetate, methyl methacrylate polymer, polyvinyl formal, etc. are not effective as detackifiers under conditions of extremely high humidities.

Another drawback of PVP is that in the course of its manufacture and handling, the polymer picks up sufficient moisture (water from the atmosphere) to substantially modify its solubility in solvents, other than lower alcohols, such as acetone, methylene chloride, etc. and prohibits its use in formulations where solvents other than the alcohols are required. Thus, PVP in an anhyrous condition is soluble in absolute ethanol, acetone and methylene chloride, and enjoys considerable use in the formulation of aerosol propellent mixtures. However, storage of PVP at 50% relative humidity yields a material which posseses solubility at a 10% level in absolute ethanol but is not completely soluble in acetone and methylene chloride. One prime reason which rules out the use of PVP in the formulation of aerosol compositions for the application of films to surfaces other than hair is its insolubility or rather insufficient solubility in acetone and methylene chloride. In the formulation of protective film coatings for surfaces such as silver and silver plate ware to protect them from tarnishing, etc, coupled with fast drying, a concentration of the film forming medium must be at least 5% and usually the preferred concentration being 10% and higher.

It is an object of the present invention to provide a new and improved aerosol sprayable film forming composition being particularly adaptable as a surface coating medium and as a hair setting and hair dressing composition which is free from foregoing disadvantages and which in addition possesses new and desirable properties.

Other objects and advantages will become more clearly apparent from the following description.

I have found that a film forming composition possessing new and novel properties comprises a solution of a copolymer of N-vinyl-ε-caprolactam and a copolymerizable compound in either alcohol, methylene chloride or acetone which is useful in aerosol sprays and can be applied directly to various surfaces, including human hair. Such solution in combination with an aerosol propellant, of the liquefied chlorofluoro-hydrocarbons of one to two carbon atoms, or mixtures thereof, yields a very glossy film which is tack-free not only under normal relative humidity, but also at substantially high relative humidity.

I have further found that copolymers of N-vinyl-ε-caprolactam when stored at 50% relative humidity yield materials which are soluble at 10% levels not only in the lower alcohols but also in acetone and methylene chloride. In view of this unique property, the copolymers are extremely suitable for full utilization in a wide range of solvents even if the film thereof is exposed to high humidity conditions. In other words, the copolymers are very suited in the lower alcohols, methylene chloride and acetone since they posses solubility in excess of 10% which is not possible with PVP.

The copolymers of N-vinyl-ε-caprolactam utilized in the preparation of aerosol film forming compositions in accordance with the present invention have the following structure:

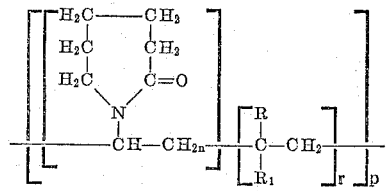

wherein "$n$" and "$r$" represent the average relative molar proportions of the monomers in the copolymers, "$p$" represents an average value indicative of the molecular weight and where R represents either hydrogen or a methyl group and R' represents either $$-OCOCH_3, -COOCH_3, -COOC_2H_5, -CN,$$
$$-\overset{H}{O\overset{|}{C}=O}$$
$$-CONH_2, -OCH_3 \text{ or } -OC_2H_5$$

Viscosity measurements are normally used as an indication of the average molecuar weight of the foregoing copolymers which ranges from 2000 to 500,000. The viscosity coefficient K is, as is well known, caluculated as follows:

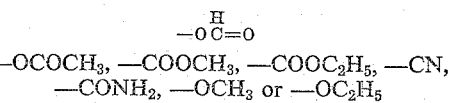

where C is the concentration in grams per 100 cc. of homopolymer solution (butyrolactone as solvent) and the $\eta$ rel is the ratio of viscosity of the solution to that of pure solvent. For the purpose of the present invention, I employ copolymers having a K value of from 10 to 100.

The copolymerizable compounds which may be copolymerized with N-vinyl-ε-caprolactam include vinyl esters such as vinyl acetate, vinyl isopropenyl acetate and the like; alkyl acrylates such as methyl acrylate, ethyl acrylate, methyl methacrylate and the like; acrylamides such as acrylamide, methacrylamide and the like; acrylonitriles such as acrylonitrile, methacrylonitrile and the like; alkyl vinyl ethers such as methyl vinyl ether, ethyl vinyl ether, isopropenyl methyl vinyl ether and the like.

Copolymers of N-vinyl-ε-caprolactam with the foregoing comonomers are ideally suited for hair fixative preparation where the proportion by weight of N-vinyl-ε-caprolactam is about 80% and above and preferably in the range of 90 to 95% (i.e., 5–20% comonomer).

The following Table I indicates the type of comonomer, moles per 100 g. of copolymer compound and molar ratio of N-vinyl-ε-caprolactam to comonomer in the 8:2 and 9:1 wt. ratio copolymers.

TABLE I

| Comonomer | R | R' | Moles Wt. | 80:20 by wt. Copolymer | | 90:10 by wt. Copolymer | |
|---|---|---|---|---|---|---|---|
| | | | | Moles Comonomer per 100 g. | Molar Ratio, Vinyl lactam : comonomer | Moles Comonomer per 100 g. | Molar Ratio, Vinyl Lactam to Comonomer |
| Vinyl formate | H | –OC=O (H) | 72 | 0.278 | 2.33:1.0 | 0.139 | 4.66:1.0 |
| Vinyl acetate | H | –OCOCH$_3$ | 86 | 0.232 | 2.79:1.0 | 0.116 | 5.57:1.0 |
| Isopropenyl acetate | CH$_3$ | –OCOCH$_3$ | 100 | 0.200 | 3.24:1.0 | 0.100 | 6.47:1.0 |
| Methyl acrylate | H | –COOCH$_3$ | 86 | 0.232 | 2.79:1.0 | 0.116 | 5.57:1.0 |
| Ethyl acrylate | H | –COOC$_2$H$_5$ | 100 | 0.200 | 3.24:1.0 | 0.100 | 6.47:1.0 |
| Methyl methacrylate | CH$_3$ | –COOCH$_3$ | 100 | 0.200 | 3.24:1.0 | 0.100 | 6.47:1.0 |
| Acrylamide | H | –CONH$_2$ | 71 | 0.282 | 2.30:1.0 | 0.141 | 4.60:1.1 |
| Methacrylamide | CH$_3$ | –CONH$_2$ | 85 | 0.236 | 2.75:1.0 | 0.118 | 5.50:1.0 |
| Acrylonitrile | H | –CN | 53 | 0.378 | 1.72:1.0 | 0.189 | 3.43:1.0 |
| Methacrylonitrile | CH$_3$ | –CN | 67 | 0.298 | 2.17:1.0 | 0.149 | 4.34:1.0 |
| Methylvinylether | H | –OCH$_3$ | 58 | 0.344 | 1.88:1.0 | 0.172 | 3.75:1.0 |
| Ethylvinylether | H | –OC$_2$H$_5$ | 72 | 0.278 | 2.33:1.0 | 0.139 | 4.66:1.0 |
| Isopropenylmethylether | CH$_3$ | –OCH$_3$ | 72 | 0.278 | 2.33:1.0 | 0.139 | 4.66:1.0 |

The copolymerization of the N-vinyl-ε-caprolactam with any one of the foregoing copolymerizable compounds is readily achieved by employing the ratios of the comonomers given in Table I and conducting the copolymerization reaction in the conventional manner such as disclosed in U.S.P. 2,265,450 and 2,335,454. However, for purposes of illustration, the following procedure, which was employed in preparing the various copolymers referred to hereinafter, may be used.

The polymerization apparatus consists of a 2-liter, 3-necked, round bottom Pyrex flask equipped with a half-moon stirrer, Allihn condenser, thermometer and a nitrogen-inlet tube. The flask is immersed about two-thirds of the way in a water bath containing a cold water connection and a steam connection. Thereafter, the flask is charged with the comonomers and with benzene or lower alkyl alcohol as an inert solvent diluent. The flask is then flushed with dry nitrogen and the inlet rate of nitrogen adjusted to about 40–50 bubbles per minute. The water in the water bath is heated with steam to raise the contents of the flask to reflux temperature, which is normally about 80–85° C. Thereafter, a suitable catalyst preferably 2,2'-azodiisobutyronitrile dissolved in benzene or alcohol such as methanol, ethanol, propanol, etc., is added to the flask via the condenser in small portions usually about 3 ml. portions every two minutes until the entire amount of catalyst solution is charged. The temperature of the copolymerization reaction solution is maintained between 60–76° C. by means of the water-bath. The entire heating time from the first addition of the catalyst may take from 5–7 hours. The reaction flask is then allowed to stand at room temperature overnight and the thick solution poured into large trays of either glass or stainless steel which had been precoated with a silane to prevent sticking of the copolymer to the tray. The trays are then placed in a hood with air circulating for a period of time to remove the benzene or alcohol solvent. Thereafter, the trays are dried at room temperature under a vacuum of 20–30 mm. of mercury pressure. The temperature then is raised to 45–50° C. while maintaining the vacuum until the odor of benzene or alcohol is removed. Brittle, expanded, friable copolymer is stripped from the tray and ground in any conventional mill such as the Wiley mill equipped with a No. 10 screen.

The copolymers prepared from N-vinyl-ε-caprolactam and any one of the polymerizable comonomers given above, where the proportion by weight of N-vinyl-ε-caprolactam is about 80% and above and preferably in the range of 90–95%, are ideally suited as hair fixative polymers by virtue of their low hygroscopicity and freedom from tack and adhesiveness at relatively high humidity levels. Such copolymers possess excellent solubility characteristics in regard to solubility in alcohols and chlorinated hydrocarbons which are admixed with fluorochlorohydrocarbons of the methane and ethane series to provide aerosol propellent mixtures.

During the experimentation with the present invention, I found that the copolymers of N-vinyl-ε-caprolactam with each one of the foregoing comonomers are significantly less hygroscopic than PVP. At equilibrium at various humidities, PVP absorbs approximately 60% more water than the copolymer. This indicates that the storage and handling conditions are less critical for the copolymer than for PVP, especially when moisture affects the end use. This was clearly demonstrated by the determination in duplicate of the hygroscopicity of both powders of the respective copolymers and PVP. In this test, the powders were dried to constant weight in a vacuum oven at 60° C. Then the powdered copolymers were conditioned at various relative humidities and the weight increase (hygroscopicity) at each humidity determined. A comparison of PVP powder with the 90/10 copolymer of N-vinyl-ε-caprolactam and methyl methacrylate with regard to percent weight gain at a relative humidity of 76.5% is shown in Table II.

TABLE II

Percent weight gain at 76.5% relative humidity

PVP K–30 powder _____ 50.3
90/10 N-vinyl-ε-caprolactam copolymer of methyl methacrylate _____ 10.2

From the foregoing table, it is clearly manifest that the weight gain for PVP was about 400% greater than that exhibited by the copolymer. A comparison between the homopolymer of N-vinyl-ε-caprolactam of a K-value of 30 percent weight gain at 76.5% relative humidity was in powder form was also made and it was found that the 21.9%. The latter weight gain for the homopolymer of N-vinyl-ε-caprolactam was about 100% greater than that exhibited by the foregoing copolymer of N-vinyl-ε-caprolactam. The results given in Table II clearly show that while the homopolymer of N-vinyl-ε-caprolactam is significantly less hygroscopic than PVP, the copolymers of N-vinyl-ε-caprolactam are less hygroscopic than polyvinyl-ε-caprolactam. The low degree of hygroscopicity of the copolymers of N-vinyl-ε-caprolatam offers considerable advantage in that it minimizes the need for special handling precautions during storage and permits a more flexible choice of solvents.

A comparison of the 80/20 polyvinylcaprolactam-vinyl acetate copolymer with PVP is offered in regard to the influence of humidity under storage conditions. Both polymers, as freshly prepared, are soluble in methylene chloride, but after storage at 50% relative humidity (RH), only the copolymer remains soluble. In acetone, the PVP as a commercial grade is insoluble, while the copolymer is soluble as prepared and after storage at 50% RH. The solubility at 10% concentration is shown in Table III.

TABLE III

| Products | Methylene Chloride | Acetone |
| --- | --- | --- |
| PVP K-30, as received | Sol., clear sol'n | Insol., 2 phases. |
| PVP K-30, after 50% RH Storage | Insol., 2 phases | Do. |
| Polyvinyl-ε-Caprolactam-Vinyl Acetate, 80/20 copolymer. | Sol., clear sol'n | Sol., clear sol'n. |
| Polyvinyl-ε-Caprolactam-Vinyl Acetate, 80/20, after 50% RH storage. | ----do---- | Do. |

Clear sprayable compositions from the 80/20 and 90/10 copolymers of N-vinyl-ε-caprolactam and each of the comonomers of Table I were prepared containing 2% by weight of copolymer, 18% ethanol, 40% "Genetron 11" (trichloromonofluoromethane) and 40% "Genetron 12" (dichlorodifluoromethane). The compositions were sprayed onto natural brown hair samples. The dried films had good adhesion, were glossy, gave body to the hair, and could be easily rewet and reset with a comb to renew the gloss and body.

The freedom from tackiness of films from the above on contact with a dry finger was evident by examination at (a) 50% RH at 77° F., (b) 90% RH at 80° F. and (c) 90% RH at 90° F. By contrast, PVP gave a non-tack film only at 50% RH at 77° F. This same behavior was manifested on contacting the films with a damp finger.

An important measure of the advantages to be offered by a non-hygroscopic polymeric hair fixative is a determination of the adhesiveness of polymer films to paper strips at various relative humidities. Films from the 80/20 and 90/10 copolymers were examined for adhesiveness to paper at (a) 50% RH at 77° F., (b) 90% RH at 80° F. and (c) 90% RH at 90° F. and found to exhibit no adhesion. By contrast PVP was adhesive at 50% RH and increasingly so at the higher relative humidities studied.

For the preparation of aerosol hair spray compositions, the concentration in percent by weight of each of the copolymers of N-vinyl-ε-caprolactam with any one of the comonmers of Table I may range from 2 to 4%. For film coating purposes other than hair, the concentration may range from 5% to as high as 10% by weight.

The following is an illustrative list of the chlorofluoro hydrocarbons of the methane and ethane series that may be employed as the aerosol propellants for solutions of the copolymers in either the lower alcohols, preferably anhydrous, such as methanol, ethanol, propanol and isopropanol, methylene chloride and acetone, either individually or in admixture:

| | |
| --- | --- |
| Freon-11 / Genetron-11 | Trichloro-monofluoromethane. |
| Freon-12 / Genetron-12 | Dichlorodifluoro-methane. |
| Freon-22 / Genetron-141 | Difluoro-monochloromethane. |
| Freon-21 | Dichloromonofluoro-methane. |
| Genetron-100 | Difluoroethane. |
| Genetron-101 | Monochlorodifluoro-ethane. |
| Freon-113 / Genetron-226 | Trichlorotrifluoro-ethane. |
| Freon-114 / Genetron-320 | Dichlorotetrafluoro-ethane. |

The following examples will illustrate the preparation of several aerosol compositions employing copolymers of N-vinyl-ε-caprpolatam as the film former. All percentages given are by weight.

*Example 1*

A composition for use in an aerosol dispenser was prepared from a copolymer obtained by the copolymerization of 90 parts of N-vinyl-ε-caprolactam and 10 parts of vinyl acetate in 233 parts of absolute ethanol and 0.3 part of azobisisobutyronitrile. The Fikentscher K-value was 35.7 (1% solution in ethanol). The mixture contained 2% of the above copolymer, 18% absolute ethanol, 40% monofluorotrichloromethane and 40% dichlorodifluoromethane. The composition was clear and homogeneous at temperatures from −30° C. to +30° C.

The above composition was sprayed onto natural brown human hair samples. The dried films had good adhesion, were glossy and gave body to the hair, and could be easily rewet with a comb to renew the gloss and body.

Films were sprayed on glass plates from the above aerosol propellent composition. The films were clear, possessed an extremely high gloss and were virtually free of tack as judged by the application of a dry human finger and a breath moistened finger. This freedom from tack was demonstrated on films that were stored at 50% and 90% relative humidity. In addition, the films were easily water dispersible. The adhesive properties of the film were nil as judged by the application of a piece of dry paper to the films stored at 50 and 90% relative humidity.

The molar ratio of N-vinyl-ε-caprolactam to vinyl acetate employed in the above copolymer was 5.57:1.00.

*Example 2*

The composition of Example 1 was modified to contain 1.8 parts by weight of the 90:10 N-vinyl-ε-caprolactam-vinyl acetate copolymer, 0.2 part by weight of diethylene glycol, 40 parts by weight of monofluorotrichloromethane, 40 parts by weight of difluorodichloromethane and 18 parts of absolute ethanol.

*Example 3*

A non-alcoholic sprayable composition was prepared in the conventional cold-loading manner while employing the following components:

| | Pts. |
| --- | --- |
| 80:20 copolymer of N-vinyl-ε-caprolactam and vinyl acetate | 4 |
| Methylene chloride | 56 |
| Dichlorodifluoromethane | 40 |

The above mixture was clear and homogeneous at temperatures from −30° to +30° C. Films deposited from the above composition were non-tacky and free from adhesiveness at high relative humidities.

The above copolymer was prepared in absolute ethanol at 65–68° C., employing a molar ratio of N-vinyl-ε-caprolactam to vinyl acetate of 2.79:1.00. The amount of azobisisobutyronitrile employed as polymerization catalyst was 0.3%. The Fikentscher K-value was 31.6 (1% solution in ethanol).

Example 4

A liquid hair-dressing preparation of the aqueous ethanol type which offers effective hair grooming is provided by the following compositions:

| | Percent |
|---|---|
| 95/5 copolymer of N-vinyl-ε-caprolactam and vinyl acetate | 3 |
| Ethanol, proprietary grade | 62 |
| Water | 25 |
| Polyethylene glycol (average molec. wt. 600) | 10 |

The above composition provides a tack-free film on human hair that possesses excellent luster, gloss and body. In addition, it is oil-free and does not flake off the hair upon successive combing and brushing.

Example 5

An aerosol composition prepared from a copolymer obtained by the copolymerization of 95 parts of N-vinyl-ε-caprolactam and 5 parts of methyl methacrylate in 233 parts of absolute ethanol and 0.4 part of azobisisobutyronitrile at 65–70° C. The Fikentscher K-value was 27.1 (1% solution in ethanol). The molar ratio of monomers was 13.0:1.0.

The aerosol composition contained 2% of the above copolymer, 18% absolute ethanol, 40% monofluorotrichloromethane and 40% difluorodichloromethane. The mixture was clear and homogeneous at temperatures from −30° C. to +30° C.

Films deposited on natural brown hair had excellent adhesion, gloss and body. The hair could be easily rewet with a comb to give renewed gloss and set.

The aerosol propellent composition was sprayed onto glass and metal plates. The resulting films were of high gloss and luster. In addition, they possessed freedom from tack and adhesiveness, as judged by the application of a breath moistened finger.

Example 6

A non-alcoholic sprayable composition was prepared in the conventional cold filling manner while employing the following components:

| | Pts. |
|---|---|
| 90:10 copolymer of N-vinyl-ε-caprolactam and acrylonitrile | 3 |
| Methylene chloride | 57 |
| Dichlorodifluoromethane | 40 |

Films deposited from the above formulation were non-tacky, non-adhesive, had high gloss and luster.

Example 7

A non-alcoholic sprayable composition was prepared in the conventional cold filling manner while employing the following components:

| | Pts. |
|---|---|
| 95:5 copolymer of N-vinyl-ε-caprolactam and ethyl vinyl ether | 3 |
| Acetone | 47 |
| Dichlorodifluoromethane | 50 |

Example 8

A liquid hair-dressing preparation of the aqueous ethanol type which offers effective hair grooming is provided by the following composition:

| | Percent |
|---|---|
| 85/15 copolymer of N-vinyl-ε-caprolactam and acrylamide | 3 |
| Ethanol proprietary grade | 62 |
| Water | 25 |
| Polyethylene glycol (average molec. wt. 400) | 10 |

I claim:

1. A film forming composition comprising a copolymer of from 80 to 95% by weight of N-vinyl-ε-caprolactam and from 5 to 20% by weight of a polymerizable monomer selected from the class consisting of vinyl esters of from 3 to 6 carbon atoms, alkyl acrylates of from 4 to 5 carbon atoms, and acrylamides, acrylonitriles and alkyl vinyl ethers of from 3 to 4 carbon atoms, said copolymer dissolved in a solvent selected from the class consisting of lower alcohols, methylene chloride and acetone and said solution further dissolved in at least one liquefied propellant selected from the class consisting of chlorofluorohydrocarbons of the methane and ethane series.

2. A film forming composition comprising a copolymer of from 80 to 95% by weight of N-vinyl-ε-caprolactam and from 5 to 20% by weight of vinyl acetate dissolved in a solvent selected from the class consisting of lower alcohols, methylene chloride and acetone and said solution further dissolved in at least one liquefied propellant selected from the class consisting of chlorofluorohydrocarbons of the methane and ethane series.

3. A film forming composition comprising a copolymer of 90–95% by weight of N-vinyl-ε-caprolactam and 5–10% by weight of methyl methacrylate dissolved in a solvent selected from the class consisting of lower alcohols, methylene chloride and acetone and said solution further dissolved in at least one liquified propellant selected from the class consisting of chlorofluorohydrocarbons of the methane and ethane series.

4. A film forming composition comprising a copolymer of 90% by weight of N-vinyl-ε-caprolactam and 10% by weight of acrylonitrile dissolved in a solvent selected from the class consisting of lower alcohols, methylene chloride and acetone and said solution further dissolved in at least one liquified propellant selected from the class consisting of chlorofluorohydrocarbons of the methane and ethane series.

5. A film forming composition comprising a copolymer of 95% by weight of N-vinyl-ε-caprolactam and 5% by weight of ethyl vinyl ether dissolved in a solvent selected from the class consisting of lower alcohols, methylene chloride and acetone and said solution further dissolved in at least one liquefied propellant selected from the class consisting of chlorofluorohydrocarbons of the methane and ethane series.

6. A film forming composition comprising a colpolymer of 85% by weight of N-vinyl-ε-caprolactam and 15% by weight of acrylamide dissolved in a solvent selected from the class consisting of lower alcohols, methylene chloride and acetone and said solution further dissolved in at least one liquefied propellant selected from the class consisting of chlorofluorohydrocarbons of the methane and ethane series.

References Cited in the file of this patent

UNITED STATES PATENTS

| 2,667,473 | Morner | Jan. 26, 1954 |
| 2,723,248 | Wright | Nov. 8, 1955 |
| 2,941,980 | Robinson | June 21, 1960 |

FOREIGN PATENTS

| 747,806 | Great Britain | Apr. 11, 1956 |

OTHER REFERENCES

Di Giacomo, American Perf. and Aromatics, 69:5, May 1957, pp. 45–50.

Handbook of Chemistry and Physics, Chemical Rubber Publishing Company, Cleveland, Ohio, 1957, p. 730.

Merck Index, Seventh Edition, Merck and Co., Inc., Rahway, New Jersey, 1960, pp. 17 and 661.

Schimmel Briefs, No. 303, Schimmel and Co., Inc., Newburgh, New York, June 1960, 1 page.

UNITED STATES PATENT OFFICE
CERTIFICATE OF CORRECTION

Patent No. 3,145,147                                           August 18, 1964

Samuel A. Glickman

It is hereby certified that error appears in the above numbered patent requiring correction and that the said Letters Patent should read as corrected below.

Column 4, lines 74 and 75, strike out "percent weight gain at 76.5% relative humidity was in powder form was also made and it was found that the" and insert instead -- in powder form was also made and it was found that the percent weight gain at 76.5% relative humidity was --; column 6, line 18, for 'N-vinyl-$\epsilon$-caprpolatam" read -- N-vinyl-$\epsilon$-caprolactam --.

Signed and sealed this 4th day of May 1965.

(SEAL)
Attest:

NEST W. SWIDER                                        EDWARD J. BRENNER
Attesting Officer                                     Commissioner of Patents